July 31, 1951     E. F. MOGREN     2,562,809
ANIMAL TRAP
Filed May 3, 1945     2 Sheets-Sheet 1
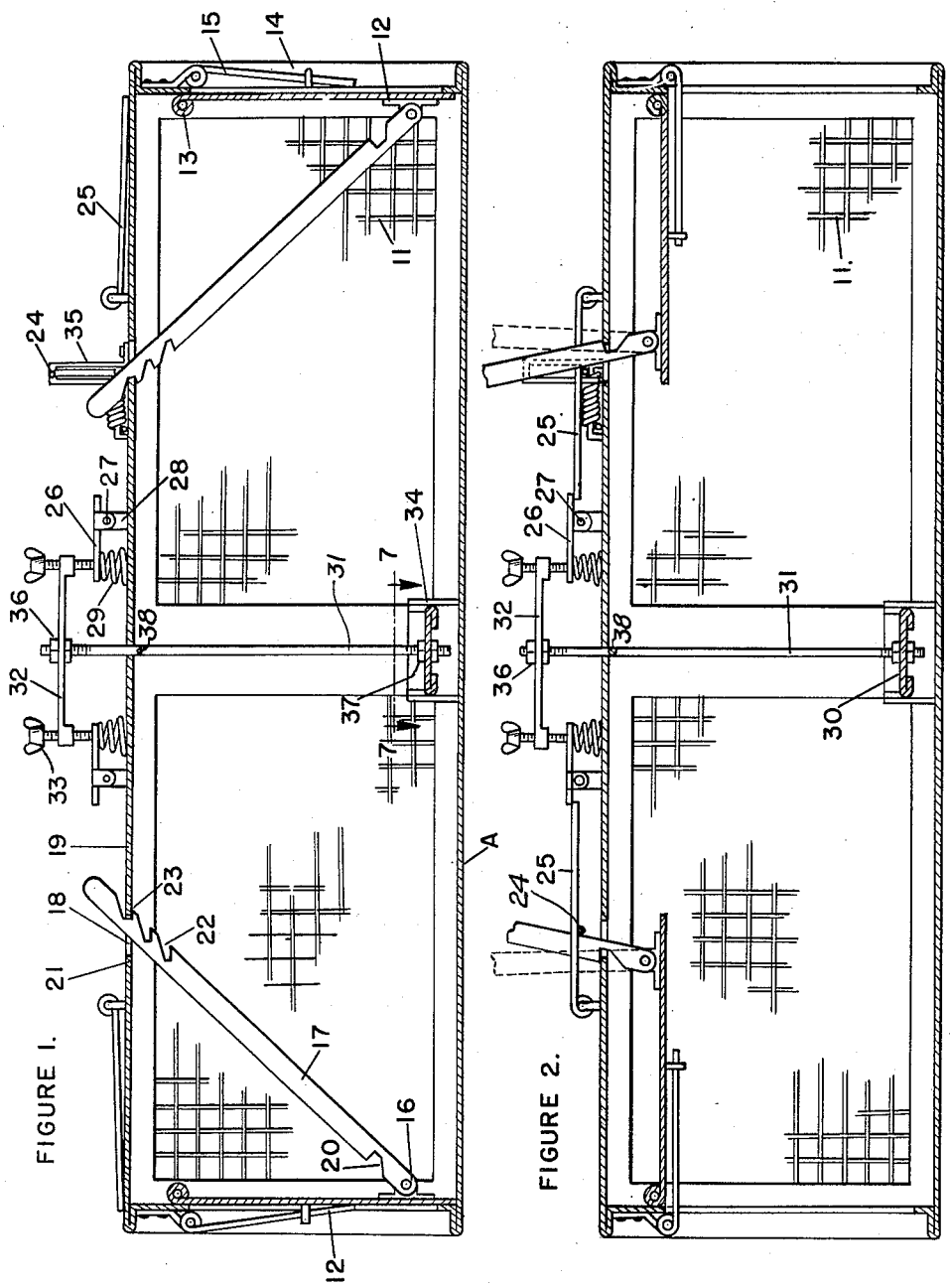
INVENTOR.
EBEN F. MOGREN
BY
*Victor J. Evans & Co.*
ATTORNEYS July 31, 1951
E. F. MOGREN
2,562,809
ANIMAL TRAP
Filed May 3, 1945
2 Sheets-Sheet 2
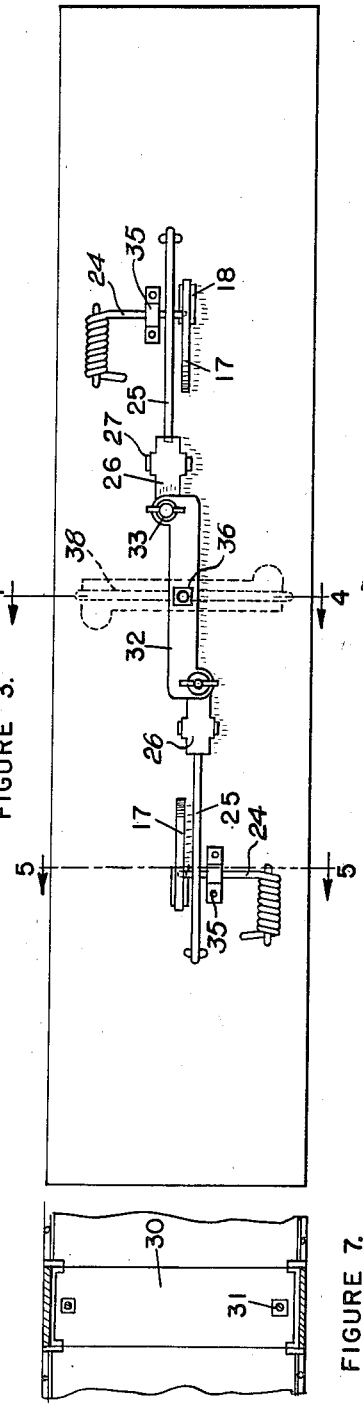
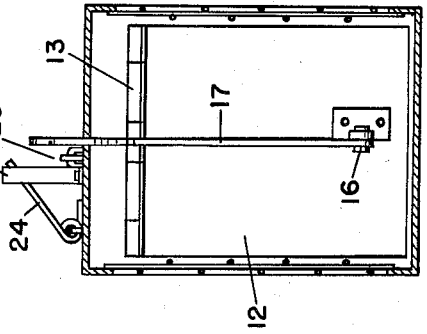
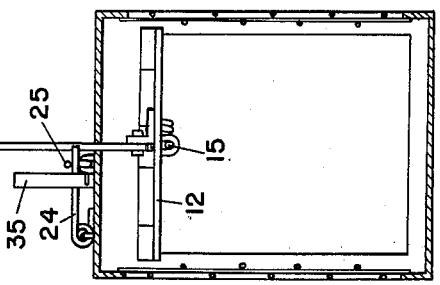
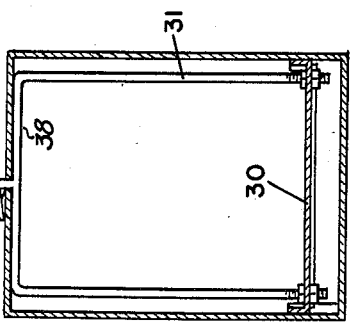
INVENTOR.
EBEN F. MOGREN
BY
*Victor J. Evans & Co.*
ATTORNEYS Patented July 31, 1951

2,562,809

UNITED STATES PATENT OFFICE 2,562,809

ANIMAL TRAP

Eben F. Mogren, Weaver, Minn.

Application May 3, 1945, Serial No. 591,682

4 Claims. (Cl. 43—61)

The invention relates to traps and more especially to trigger released fowl and animal traps.

The primary object of the invention is the provision of a trap of this character, wherein a fowl or animal entering the trap, it being enticed by bait or the like, will cause the release of the door of the trap, which is sustained open by a trigger, and the closing of the door prisons the fowl or animal, without injury to the latter.

Another object of the invention is the provision of a trap of this character, wherein the construction thereof is such that it is most sensitive, thus assuring a positive catch of the fowl or animal on entry to the said trap, the trap being humane, in that it does not inflict injury in the catching of the fowl or animal.

A further object of the invention is the provision of a trap of this character, wherein the trigger action is responsive to adjustability, to vary its sensitiveness, and the door to the trap is held closed by tension thereon, so that an animal or fowl cannot make an escape from the trap under all conditions, until the said door has been manually opened.

A still further object of the invention is the provision of a trap of this character, which is simple in construction, thoroughly reliable and efficient in operation, strong, durable, quick in action, readily portable, and inexpensive to manufacture.

With these and other objects in view the invention consists in the features of construction, combination and arrangement of parts as will be hereinafter more fully described, illustrated in the accompanying drawings, which disclose the preferred form of the invention, and pointed out in the claims hereunto appended.

In the accompanying drawings:

Figure 1 is a vertical longitudinal sectional view of the trap constructed in accordance with the invention, and showing its doors closed.

Figure 2 is a view similar to Figure 1 showing the doors opened.

Figure 3 is a top plan view.

Figure 4 is a sectional view on the line 4—4 of Figure 3 looking in the direction of the arrows.

Figure 5 is a sectional view on the line 5—5 of Figure 3 looking in the direction of the arrows, with the door open.

Figure 6 is a similar view to Figure 5 showing the door closed.

Figure 7 is a detail sectional view taken on the line 7—7 of Figure 1 looking in the direction of the arrows.

Similar reference characters indicate corresponding parts throughout the several views in the drawings.

Referring to the drawings in detail A designates generally the trap constructed in accordance with the invention and hereinafter set forth in detail.

The trap A comprises a box-like cage, preferably formed from metal, although it can be made from any other suitable material, having wire screen sides 11. The opposite open ends of the body of the cage are adapted to be closed by vertically swinging doors 12, these being hinged at 13 to the top framing 14 for the said doors. Each of the doors 12 is held closed by a tensioning spring 15 acting directly thereon.

Each door 12 has pivoted at 16 thereto a latching lever 17 which slidably fits a slot 18 in the top 19 of the cage, the latching notch 20 in this lever 17 engages the edge 21 of the slot to hold the door open, while the series of latching notches 22 engage, respectively, another edge 23 of the slot 18 for holding the door closed, the gravitating action of the lever 17 effects the engagement of the notches 22 in successive order when the door is closing. In the event it is desired to fix the doors 12 in their open position during removal of trapped animals, or to clean the trap, the levers 17 can be pushed to the positions shown by the dotted lines in Figure 2 to fully engage the slot 20 with the edge 21, thereby preventing the levers 17 from becoming disengaged from 21.

When the trap is ready for use, each lever is moved from its dotted line position to its full line position, as shown in Figure 2, whereby the notch 20 is held partially engaged with the edge 21 by a tripping spring 24 mounted on the top of the cage, and this spring 24 is held in position for the latching of the lever 17 by a trigger 25 vertically swingable upon the top of the said cage. The spring 24 when released by the trigger 25 in turn frees the lever 17 for movement through the slot 18. The trigger 25 is held set or cocked by a trip member 26 pivoted at 27 in a bearing 28 close to the said trigger. The tripping member 26 is acted upon by a coiled tensioning spring 29 for holding it engaged with the trigger in its overlapped relation thereto at the meeting ends of the same.

Within the center of the trap cage is a tread piece 30 which may carry bait (not shown) or the latter may be hung directly thereover for enticing animals or fowls within the cage, and rising from this piece is a pull member 31 which is slidable through a suitable clearance in the top of the cage to be disposed intermediate of the several tripping members 26 thereon. This member has a bridge part 32, the member 31 being in the form of an inverted substantially U-shaped bail, and the bridge part 32 is swingable over or away from the tripping members 26 and is fitted with wing headed hand adjusted screws 33 which are adapted to play upon the members 26 to vary the action of the coiled springs 29 to increase or decrease sensitiveness of these members in their coaction with the triggers 25 when the screws 33 are directly over such members 26, as will be apparent from Figures 1, 2 and 3 of the drawings.

To effect manual release of the trip members 26 from their engagement with the triggers 25 the bridge part 32 can be laterally turned away from the same, as is shown by dotted lines in Figure 3 of the drawings.

The tread piece 30 is arranged in a guide 34 built within the cage and an animal or fowl when treading such piece effects the tripping of the members 26 for their disengagement from the triggers 25 which results in the automatic freeing of the doors 12 when in open position for the closing of such doors to entrap the animal or fowl within the cage without inhumane treatment thereof.

The springs 24 play in ways 35 arranged upright upon the top of the cage which limit the springy movement thereof in clearing the levers 17. The bridge piece 32 is fastened to the pull member 31 by fasteners 36, and the pull member is secured to the tread piece 30 by fasteners 37. This tread piece 30 is disposed transversely of the cage throughout its width. The animal or fowl can make entry to the cage through either open end thereof, if the doors 12 are in open position as should be obvious, these doors being closed simultaneously for the trapping of the fowl or animal.

The closed upper end 38 of the member 31 limits the upward displacement of the same by coming in contact with the top of the cage, this being true when under the tension of the coil springs 29, and when the bridge part 32 is swung away from the members 26, the tread piece 30 settles to the bottom of the cage.

In operation, the enticed animal steps on the tread piece 30 pulling down bridge piece 32 to tilt the tripping members 26, which in turn allows the triggers 25 to be snapped upwardly by the tripping springs 24. These tripping springs 24 fly upwardly and clear the levers 17, as shown in Figure 6. As the lever 17 has its notch 20 only partially engaged by the edge 21, it is in an unstable tilted position, as shown by its full line position in Figure 2. When the tripping springs 24 move away out of engagement with the lever 17, as shown in Figure 6, the tensioning springs 15 associated with the doors 12 will function through these doors 12 to cause the same to unseat the notch 20 from the edge 21, thereby causing the lever 17 to drop through slot 18, as shown in Figure 1.

What is claimed is:

1. A trap of the kind described, comprising a cage having opposite open ends and latching means, closing doors for the open ends, spring biasing means for moving said doors to a closing position, latching levers adapted to cooperate with said latching means, means swingingly connecting said levers to the doors for latching the latter in open or closed positions, respectively, wire spring means biasing the levers against said latching means to hold the doors open, trigger means maintaining the wire spring means in position to bias the levers against the latching means, trip member means engaging the trigger means, a tread piece within the cage, and means connecting said tread piece and the trip member means and adapted to release said trip member means from the trigger means on the depressing of said tread piece whereby said spring biasing means will move said doors to a closing position.

2. A trap of the kind described, comprising a cage having opposite open ends and latching means, closing doors for the open ends, spring biasing means for moving said doors to a closing position, latching levers adapted to cooperate with said latching means, means swingingly connecting said levers to the doors for latching the latter in open or closed positions, respectively, a wire spring means biasing the levers against said latching means to hold the doors open, trigger means maintaining the wire spring means in position to bias the levers against the latching means, trip member means engaging the trigger means, a tread piece within the cage, means connecting said tread piece and the trip member means and adapted to release said trip member means from the trigger means on the depressing of said tread piece whereby said spring biasing means will move said doors to a closing position, and means for adjusting the tread piece relative to said connecting means.

3. A trap of the kind described, comprising a cage having opposite open ends and latching means, closing doors for the open ends, spring biasing means for moving said doors to a closing position, latching levers adapted to cooperate with said latching means, means swingingly connecting said levers to the doors for latching the latter in open or closed positions, respectively, a wire spring means biasing the levers against said latching means to hold the doors open, trigger means maintaining the wire spring means in position to bias the levers against the latching means, trip member means engaging the trigger means, a tread piece within the cage, means connecting said tread piece and the trip member means and adapted to release said trip member means from the trigger means on the depressing of said tread piece whereby said spring biasing means will move said doors to a closing position, means for adjusting the tread piece relative to said connecting means, and means yieldingly holding the trip member means engaged with the trigger means.

4. A trap of the kind described, comprising a cage having opposite open ends and latching means, closing doors for the open ends, spring biasing means for moving said doors to a closing position, latching levers adapted to cooperate with said latching means, means swingingly connecting said levers to the doors for latching the latter in open or closed positions, respectively, a wire spring means biasing the levers against said latching means to bias the doors open, trigger means maintaining the wire spring means in position to hold the levers against the latching means, trip member means engaging the trigger means, a tread piece within the cage, means connecting said tread piece and the trip member means and adapted to release said trip member means from the trigger means on the depressing of said tread piece whereby said spring biasing means will move said doors to a closing position, means for adjusting the tread piece relative to said connecting means, means yieldingly holding the trip member means engaged with the trigger means, and guide means for the tread piece interiorly of the cage.

EBEN F. MOGREN.

REFERENCES CITED

The following references are of record in the file of this patent:

UNITED STATES PATENTS

| Number | Name | Date |
|---|---|---|
| 1,575,456 | Sparks | Mar. 2, 1926 |
| 1,614,450 | Alburtis | Jan. 18, 1927 |
| 2,016,049 | Pritchett | Oct. 1, 1935 |

FOREIGN PATENTS

| Number | Country | Date |
|---|---|---|
| 468,516 | France | Apr. 25, 1914 |